United States Patent [19]
Du et al.

[11] Patent Number: 5,826,239
[45] Date of Patent: Oct. 20, 1998

[54] DISTRIBUTED WORKFLOW RESOURCE MANAGEMENT SYSTEM AND METHOD

[75] Inventors: Weimin Du, San Jose, Calif.; Graham Eddy, Warradyte, Australia; Ming-Chien Shan, Saratoga, Calif.

[73] Assignee: Hewlett-Packard Company, Palo Alto, Calif.

[21] Appl. No.: 768,261

[22] Filed: Dec. 17, 1996

[51] Int. Cl.$^6$ .................................................. G06F 17/60
[52] U.S. Cl. ...................................................... 705/8; 705/1
[58] Field of Search .............................................. 705/8, 1

[56] References Cited

U.S. PATENT DOCUMENTS

| | | | |
|---|---|---|---|
| 5,301,320 | 4/1994 | McAtee et al. | 395/650 |
| 5,535,322 | 7/1996 | Hecht | 395/155 |
| 5,581,691 | 12/1996 | Hsu et al. | 395/182.13 |
| 5,649,220 | 7/1997 | Yosefi | 395/788 |

Primary Examiner—Lucien U. Toplu

[57] ABSTRACT

A system and method for distributed resource management in a computer network operating under control of workflow management software system (WFMS) to manage plural resources to perform a workflow process that includes multiple process activities, uses two-step resource assignment to manage resources at two levels. The resources are grouped by capabilities into resource groups controlled by a local resource manager (LRM), which maintains dynamic status of each resource, such as availability and load, as well as their roles and addresses. A global resource manager (GRM) stores resource data only about the groups: capabilities and status. The WFMS invokes the GRM, requesting a specified resource activity. The GRM checks the stored capabilities and status among the resource groups, selects the resource group capable of the specified activity and available, and forwards the request to the LRM for the selected group. The LRM selects one of the resources in the group to perform the specified activity and assigns the activity to that resource.

20 Claims, 10 Drawing Sheets

DISTRIBUTED WORKFLOW RESOURCE MANAGEMENT SYSTEM AND METHOD

A portion of the disclosure of this patent document contains material which is the subject of copyright protection. The copyright owner has no objection to facsimile reproduction by anyone of the patent document or the patent disclosure, as it appears in the U.S. Patent and Trademark Office file or records, but otherwise reserves all copyrights whatsoever.

BACKGROUND OF THE INVENTION

This invention relates to the field of workflow process management and more particularly to apparatus and methods for implementing resource management in a workflow process management system.

Workflow process re-engineering, that is, the fundamental rethinking and re-implementation of workflow processes to achieve never-before-possible levels of quality, cost, throughput and service, is emerging as one of the crucial business strategies of the 1990s. The need for re-engineering is especially significant in an era of workforce downsizing coupled with greater demands for shortened time to market and faster customer response. Moreover, the need is pervasive. Organizations are currently engaging in workflow process re-engineering in many domains, including financial services, telecommunications services, healthcare services, customer order fulfillment, manufacturing procedure automation and electronic commerce.

While workflow process re-engineering provides a business management concept, workflow process management (WFPM) software—or more accurately, middleware—provides the enabling technologies for actually performing workflow process re-engineering. WFPM supports flexible solutions for the management of enterprise-wide operations, including workflow process control, automation and monitoring; resource allocation, authorization and authentication; task initialization and data exchange; and end-to-end communication and security. However, while WFPM offers an overall environment and approach to unifying, automating and measuring workflow processes, it is not limited to supporting workflow process re-engineering and can be used to manage existing nonautomated legacy or work processes.

In general, WFPM systems perform a wide range of tasks. For instance, they can provide a method for defining and managing the flow of a work process or support the definition of resources and their attributes. In addition, they can assign resources to work, determine which steps will be executed next within a work process and when they will be executed and can ensure that the workflow process continues until proper termination. Moreover, they can notify resources about pending work, enforce administrative policies, such as access control and track execution and support user inquiries of status. Finally, they can provide history information in the form of an audit trail for completed workflow processes and collect statistical data for process and resource bottleneck analysis, flow optimization and automatic workload balancing.

Moreover, given the trend towards open systems and standards, a WFPM system must coexist with and take advantage of standards-based commercial products for network communication, legacy application invocation and system monitoring. In particular, these standards include the Object Management Group's Common Object Request Broker Architecture (CORBA), the Open Software Foundation's Distributed Computing Environment (OSF DCE), Hewlett Packard's Open View and the International Standards Organization Open Systems Interconnection (ISO OSI) X.400 technologies.

Workflow process management is a technology that provides the ability to define and automate the flow of work through an organization to accomplish business tasks. Business tasks are first modeled as workflow processes, which are then automated by workflow management systems (WFMSs). As defined by Workflow Management Coalition in its *Workflow Management Coalition Standard,* 1994, a workflow process is a coordinated set of process activities that are connected in order to achieve a common business goal. A process activity is a logical step or description of a piece of work that contributes toward the accomplishment of a workflow process. A work item defines the work to be processed in the context of a process activity and is performed by a workflow participant. A process activity can be a manual process activity and/or an automated workflow process activity. A workflow participant can be a person that performs work items for manual process activities or a computer-based application that performs work items for automated workflow process activities.

A workflow participant can usually perform work items for more than one process activity. The collection of process activities that can be assumed and performed by a workflow participant is termed a process role. In general, a workflow participant can assume several process roles and a process role can also be assumed by several participants.

A participant, when performing a work item, might also need to use or access other objects. For example, a person who prints a document apparently needs a printer. Workflow participants, together with objects they use, are external resources a workflow process management system (WFMS) needs to execute a workflow process. This need gives rise to the problem of resource management.

The problem of resource management in WFMSs is concerned with efficiently assigning resources to process activities at process execution time. Workflow processes involve the coordinated execution of tasks performed by workflow (local or remote) resources (e.g., a person, a computer-based application, a printer). Workflow resource management is concerned with keeping track of resource status and assigning available resources to workflow tasks. Traditional approaches either manage distributed resources globally at a central site, incurring huge overhead to keep track of resource status, or manage resources locally resulting in long delay at run time resource assignment.

In general, there is a resource management subsystem (or resource manager) in each WFMS that does the following:

1. Keeping track of resource status; and
2. Finding eligible, available, and hopefully least loaded resources for activities when needed.

Resource management is trivial if all resources are local and thus can be managed by a centralized resource manager. The problem becomes difficult when resources are distributed as in many workflow environments.

Distributed resources can be managed in the following two straightforward approaches:

Global management approach

The global management approach manages distributed resources using a global resource manager (GRM).

All resources will be registered to the GRM with roles they may assume.

The GRM is also responsible for keeping track of status of registered resources.

Local management approach

In this approach, resources are managed by multiple, distributed local resource managers (LRMs).

Each LRM has all status information of and full control over resources at its site.

There may be a GRM at a central site which maintains only role information of all resources, as well as their managing LRMs.

The WFMS relies on individual LRMs for resource assignment when a work item is to be performed.

The main advantage of the global management approach is that resource assignment is easy and efficient, as all resource information is local. It incurs huge overhead, however, in keeping track of status of remote resources. This approach, as described, is not practical in real workflow environments for two reasons. First, the number of remote resources is usually very large. It is extremely difficult for the GRM to keep track of load information about remote resources as it changes frequently. Second, resources usually belong to different organizations. The GRM may not have the authority to assign some of the resources.

The local resource management approach avoids the huge overhead of keeping track of dynamic changes of resources by managing them locally, but makes run-time resource assignment difficult and inefficient. The GRM has to contact remote LRMs for resource status.

Most workflow products (e.g., IBM FlowMark -F. Leymann and D. Roller, "Business Process Management with Flowmark" COMPCON, 1994) adopt a simplified version of the above approaches. As in the local management approach, the GRM maintains only static information of resources, e.g., roles and accessing addresses. There are, however, no LRMs that maintain dynamic information such as availability and work loads. It is therefore possible (and often the case) that a work item is assigned to resources that are not available at the moment or already heavily loaded. When this happens, the tasks will be queued, resulting long execution delay.

Efficient and reliable resource assignment is important for workflow process execution. This is especially true when organizations are re-engineering their businesses to rely on workflow systems for their business critical tasks. On the other hand, the problem is not easy, due to the large number of resources owned by different groups that have to be managed and their dynamic behavior.

Workflow resource management can be considered a special case of a more general problem of managing interdependent data maintained in different information systems. The latter problem is discussed in R. Alonso, D. Barbara and H. Garcia-Molina "Data caching issues in an information retrieval system" *ACM Transactions on Database Systems*, Volume 15, Number 3, pages 359–384, 1990; A. Sheth Y. Leu and A. Elmagarmid, "Maintaining consistency of interdependent data in multidatabase systems," CSD-TR-91-016, Computer Science Department, Purdue University, 1991; A. Sheth, M. Rusinkiewicz and G. Karabatis, "Specifying interdatabase dependencies in a multidatabase environment," *IEEE Computer*, Volume 24, Number 12, pages 46–53, 1991; and G. Wiederhold and X. Qian, "Modeling asynchrony in distributed databases," *International Conference on Data Engineering*, pages 246–250, Los Alamitos, Calif., 1987.

The general interdependent data management problem has previously been studied for data warehouse and multidatabase systems. Existing solutions are good for environments where source data do not change very often and for applications that can tolerate certain degrees of inconsistency between source and target data. The foci of database management solutions are, therefore, on consistency requirements such as specification of tolerable inconsistencies and ways to meet these (relaxed) consistency requirements. For example, the notion of eventual consistency has been proposed, which guarantees that changes of source data will eventually be propagated to target data at specified time or in a specified time period. These techniques, however, do not use the semantics of workflow resource management to reduce overhead for resource assignment and keeping track of the status of remote resources.

It is generally impossible to guarantee optimal resource assignments, as resource status changes all the time, even at resource assignment time. Nonetheless, a technique that can significantly reduce operation overhead is needed to maintain dynamic resource status without introducing long delay in run time resource assignment.

SUMMARY OF THE INVENTION

The present invention is a distributed resource management approach that addresses foregoing problems. The invention employs the concept of two-step resource assignment. Instead of doing resource assignment in one step either at a central site (in global management approach) or at remote sites (in local management approach), the approach of the present invention first checks at a central site the availability of resource groups, and then selects, at remote sites, specific resources from the group. A resource group is a group of resources that all can perform certain tasks. It is much easier to keep track of the status of resource groups (e.g., at least one printer is available at a site) than that of individual resources.

One aspect of the invention is the specification of resource groups and their relationships to individual resources. Another aspect is the propagation of individual resource status to resource groups at remote sites.

The present invention provides a system and method for distributed resource management in a computer network that includes multiple computers operating under control of workflow management software system (WFMS) to manage a plurality of resources to carry out a workflow process that includes multiple process activities. The computers comprise a processor, memory and input/output facilities to connect to the network. The method begins by grouping the resources according to a shared set of capabilities into resource groups including at least one resource. A global resource manager (GRM) and data defining a resource capability of one or more of said groups and a resource status for each group are stored in at least a first of said computers and can be stored in many computers in the network. In a second of said computers in the network, and preferably most if not all of them, a local resource manager (LRM) is established for at least one of the groups and data is stored defining a capability and status of each resource in each group coupled to the second computer.

The WFMS, in its operations, can invoke the global resource manager with a request for a specified activity by one of the resources in the system. The GRM responds by checking the stored capabilities and status the resource groups, selecting one of the resource groups having the capability to perform the specified activity and a status that enables the group to do so, and forwarding the request to the LRM of the second computer for the selected resource group. The LRM in the second computer can respond to the request by selecting one of the resources in the selected one of the resource groups to perform the specified activity and assigning the activity to the selected resource. The LRM in the second computer can also update the stored status data of the resources of the group(s) coupled to it and, in turn, provide status data for a group to the first computer when a specified group threshold is reached. In this way, the GRM need only maintain limited data on the group capabilities and status, and requires infrequent updates.

The contributions of this invention are not only on applying general interdependent data management techniques to workflow resource management problem, but also, and more importantly, on using semantics of workflow resource management to reduce overhead for keeping status of remote resource in sync. The invention focuses on specification of resource groups and their dependency to individual resources, rather than on specification of tolerable inconsistencies as in general approaches. Dependencies between resource groups and individual resources are enforced not only using database techniques as described in previous work, but also using workflow techniques that are more flexible and powerful.

Such an implementation of resource management is described in the context of the HP OpenPM workflow management system, summarized in J. Davis et al. "OpenPM: An enterprise process management system" *IEEE Data Engineering Bulletin,* 1995, but can be implemented in the context of other workflow management systems, such as IBM Flowmark, described by F. Leymann and D. Roller, "Business process management with FlowMark," COMPCON, 1994.

The foregoing and other objects, features and advantages of the invention will become more readily apparent from the following detailed description of a preferred embodiment of the invention which proceeds with reference to the accompanying drawings.

DETAILED DESCRIPTION

Workflow Process Management System

Figure 1:
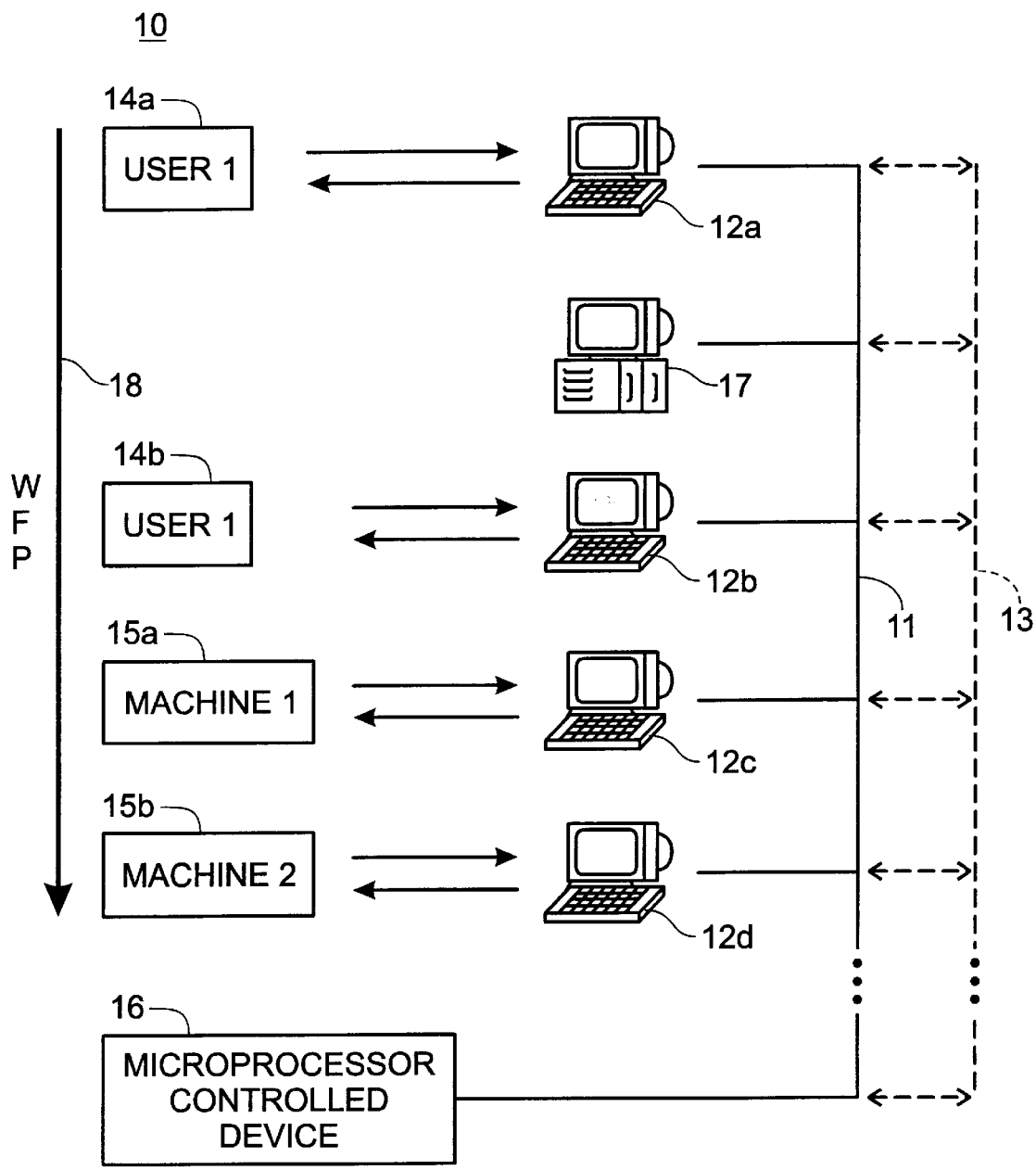
FIG. 1 is a block diagram of a process flow management system implemented in a network of computers coupled to a plurality of users and machines for management and control of workflow process activities performed by the users and machines.

FIG. 1 shows a block diagram of a workflow process management (WFPM) system 10 implemented in a network 11 of computer systems 12a–d coupled to a plurality of users 14a–b and machines 15a–b for management and control of workflow process activities. Each computer system 12a–d is shown coupled with a single user 14a–b or machine 15a–b, but multiple users or machines or combinations thereof can also be employed. The WFPM system 10 is shown from an enterprise perspective with the control and coordination of each of the computer systems 12a–d being accomplished by computer software, preferably object-oriented software, executed as a distributed application by the computer systems 12a–d. Optionally, workflow process activity information, such as resource data and rules, can be stored in a database on a centralized WFPM server 17 which is accessible by the computer systems 12a–d over the network 11 or can be stored in a plurality of databases on each of the computer systems 12a–d. The computer systems 12a–d and centralized WFPM server 17 conventionally include a processor, memory and input/output interface including network communications facilities and user input and output devices.

Each workflow process 18 includes a sequence of activities, each of which is ordinarily performed by one of the computer systems 12a–d in conjunction with an associated user 14a–b or machine 15a–b, although some activities can be performed by microprocessor-controlled devices 16 (one such device shown in FIG. 1, although multiple devices can be used), such as a telephone or facsimile machine, printing device or similar self-controlling mechanism. In addition, each machine 15a–b can be a work instrument or computer resource.

The workflow process 18 can span several business organizations (only one organization is shown in FIG. 1) with multiple activities potentially performed in parallel. In such cases, the WFPM system 10 acts as the "superstructure" that ties together disparate computer systems 12a–d whose business purposes are interconnected. The WFPM system 10 provides procedural automation 13 of the workflow process 18 by managing the sequence of process activities and the invocation of appropriate user 14a–b, machine 15a–b or microprocessor-controlled device 16 resources associated with the various activity steps.

Workflow Process Specification

The procedural automation 13 of the workflow process 18 involves the high-level specification of individual workflows (examples shown in FIG. 3 and FIG. 7) which provides the operational "glue" and environment support needed by the WFPM system 10 for managing and automating the workflow processes 18, recovering from failures and enforcing consistency. As further described hereinbelow, the WFPM system 10 also enforces various administrative policies associated with resources and work.

The specific structure and flow of each workflow process 18 managed by the WFPM system 10 can be preplanned or developed in an ad hoc fashion. For example, in a WFPM system 10 used for managing the workflow process 18 of providing telecommunications services, some aspects of the workflow process 18 are determined ad hoc and depend in part on the services required by each individual customer. However, other aspects of the workflow process 18 can be preplanned and deliberately structured. For instance, independent from the individual services required by a single customer, the workflow process 18 always originates in the sales department and typically ends in the billing department. The parts of the workflow process 18 involving these departments can be preplanned.

HP OpenPM

Figure 2:
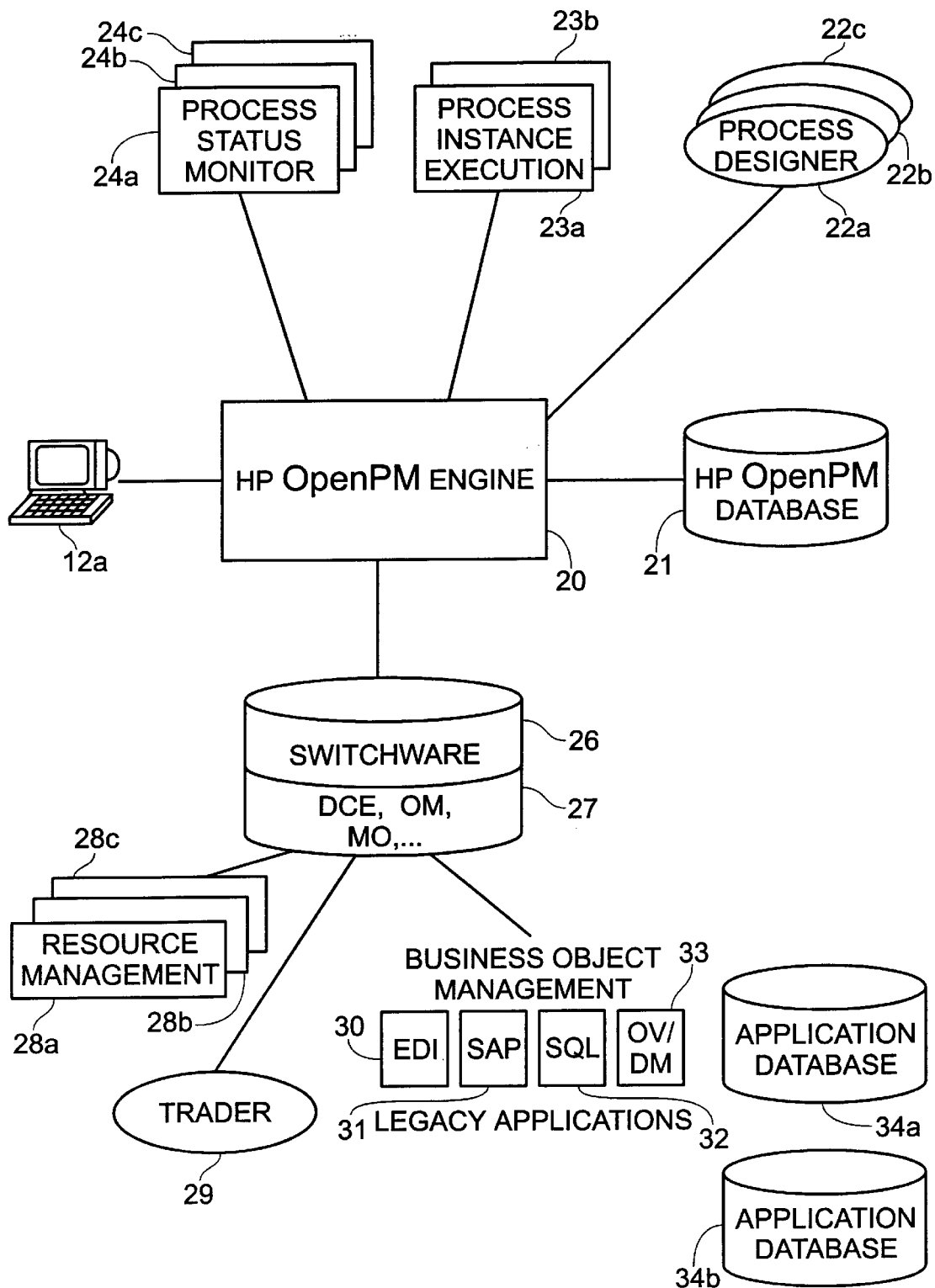
FIG. 2 is a block diagram of a hardware and software machine for a typical node in the network of FIG. 1 showing the architecture of an example of process flow management middleware employing the present invention.

FIG. 2 is a block diagram of a hardware and software machine for a typical node 12a in the network 11 of FIG. 1 showing, by way of example, an architecture for WPFM middleware employing the present invention. An example of middleware suitable for implementing the present invention is the Hewlett Packard (HP) OpenPM system. HP OpenPM is an open, enterprise-capable, object-oriented WFPM system developed at Hewlett Packard Laboratories, Palo Alto, Calif., for managing business activities that support complex enterprise processes in a distributed, heterogeneous computing environment. The use of a WFPM system 10 implemented in middleware represents a substantial evolution over traditional workflow technologies. HP OpenPM provides a generic framework and complete set of services for workflow process management using a middleware-based approach with an emphasis on performance, availability, scalability and system robustness.

Briefly, HP OpenPM provides an open system adhering to the CORBA communications infrastructure with a Workflow Management Coalition-standard interface. Second, it offers high performance as a result of optimized database access and commitment features. It also provides effective management when coupled with an HP Open View-based system management environment. Finally, HP OpenPM presents a comprehensive solution for business re-engineering, including an extensive set of products.

The overall architecture of the HP OpenPM system is depicted in FIG. 2. The core is the HP OpenPM engine 20, which supports five interfaces. The interfaces enable the HP OpenPM engine 20 to interact with workflow process designer 22a–c, workflow process instance execution 23a–b, workflow process monitor 24a–c, resource management 28a–c and business object management modules 30, 31, 32, 33. In addition, worldwide web client support is provided by each individual network node 12a which can execute middleware modules expressed in platform-independent languages, such as Java Applets and HTML code. An HP OpenPM database 21 is maintained on the centralized WFPM server 17 (shown in FIG. 1) for use by the HP OpenPM engine 20.

A workflow process 18 is specified by the process design modules 22a–c via the workflow process definition interface. An instance of a workflow process 18 can be started, controlled or stopped by the process instance execution modules 23a–b via the process execution interface. Status information of each process instance and load information for the WFPM system 10 can be queried using the process status monitor modules 24a–c via the process status monitoring interface. The resource management interface is used to allocate, at run time, execution resources to a task, according to the policies defined by the organization (including authorization and authentication) and the availability of the resources using the resource management modules 28a–c. Interaction with the external world, such as invoking an application, controlling an instrument or delivering a work order to a person's electronic mail in-box, is performed by the various business object management modules 30, 31, 32, 33.

HP OpenPM Process Model

Figure 3:
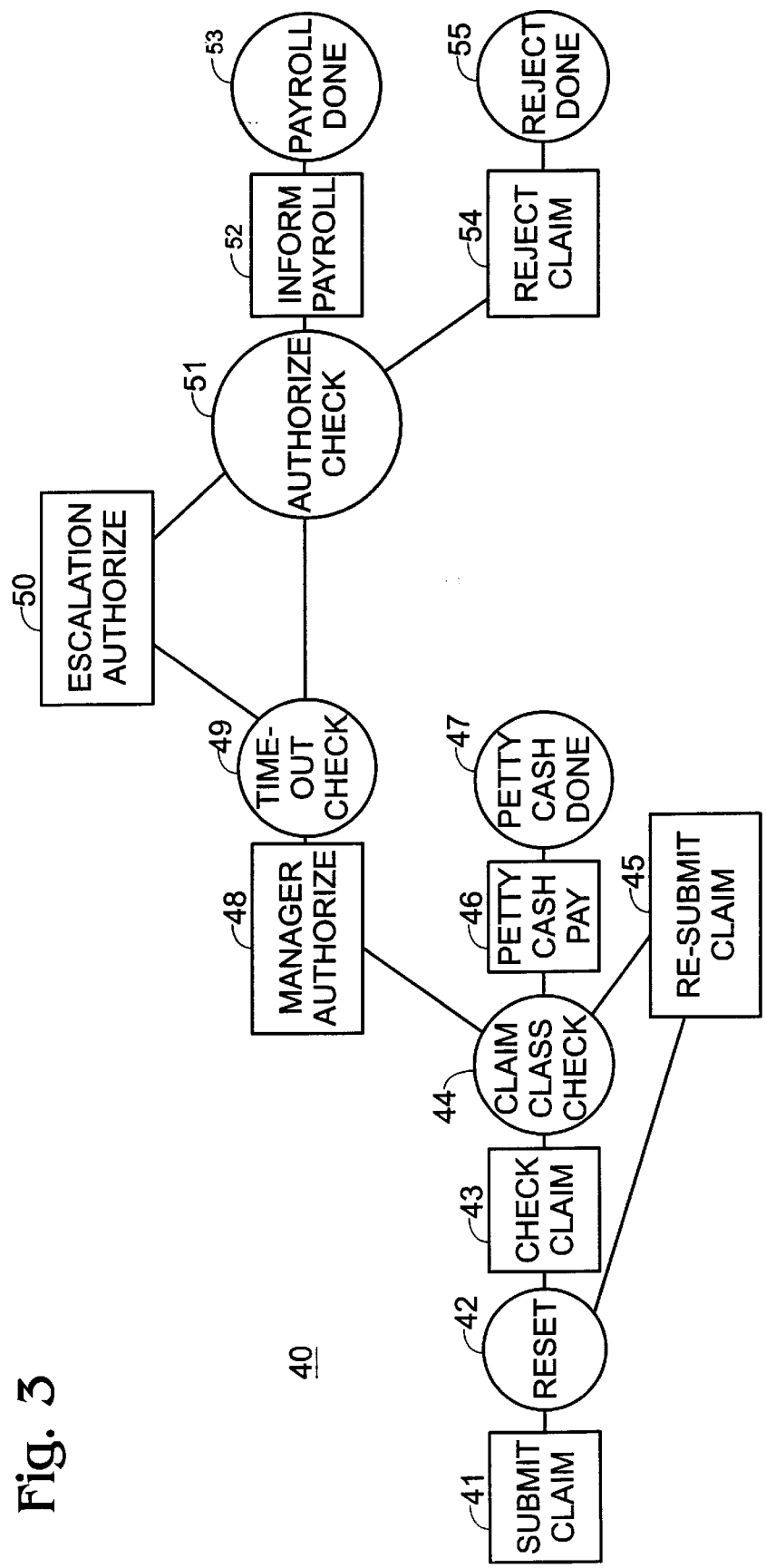
FIG. 3 is a computer display of the user interface for the user of the machine of FIG. 2 to interact with the process flow management system, the display showing an example of a process flow diagram for a business process flow managed by the system.

In general, a workflow process 18 is a description of the sequencing, timing, dependency, data, physical agent allocation, business rule and organization policy enforcement requirements of business activities needed to enact work. FIG. 3 shows, by way of example, a workflow process 18 which is represented as a directed graph 40 consisting of a set of nodes connected by arcs as displayed on the HP OpenPM user interface.

There are two kinds of nodes: work nodes 41, 43, 45, 46, 48, 50, 52, 54, which are shown as squares, and rule nodes 42, 44, 47, 49, 51, 53, 55, which are shown as circles. There are also two kinds of arcs, forward arcs and reset arcs. A work node has at most one inward arc and one or more outward arcs. A rule node can have any number of inward and outward arcs.

Forward arcs represent the normal execution flow of process activities and form a directed acyclic graph 40. Successful completion of a node at the source end of a forward arc triggers the starting of the node at the destination end of the forward arc.

Reset arcs are used to support repetitions or explore alternatives in a workflow process 18. Reset arcs differ from forward arcs in that they reach backwards in the process graph.

Work nodes 41, 43, 45, 46, 48, 50, 52, 54 represent activities to be performed external to the HP OpenPM engine 20. These activities include authorization, resource allocation, execution of business objects and provision of input data for the business objects and output data from them. Rule nodes 42, 44, 47, 49, 51, 53, 55 represent processing internal to the HP OpenPM engine 20. This processing includes decisions of about which nodes should execute next, generation or reception of events, and simple data manipulation.

A work node 41 is a placeholder for a process activity, which is a logical representation of a piece of work contributing towards the accomplishment of a process 18. A process activity is mapped to the invocation of an operation on business objects during the execution of the process and each process activity can represent a manual operation by a human or a computerizable task to execute legacy applications 30, 31, 32, 33 (shown in FIG. 2), access application databases 34a, 34b (also shown in FIG. 2), control instrumentation, sense events in the external world or effect physical changes. A process activity definition includes a forward activity and optionally, a compensation activity, a cancel activity, a resource management activity, timeout and deadline information and input and output data.

Rule nodes 42, 44, 47, 49, 51, 53, 55 are used to specify workflow processes 18 that are more complex than a simple sequence. A rule language is used to program the rule node decision. When executed, a rule node 42 determines which outward arcs to fire based on the status passed along the inward arcs, the time at which each inward arc is fired and process-relevant data associated with the process instance.

Rule nodes 42, 44, 47, 49, 51, 53, 55 are also used to support events. A rule node 42 can raise events when certain conditions are met as defined by the rules and an event can activate rule nodes that have subscribed to receive the event.

Rule nodes 42, 44, 47, 49, 51, 53, 55 are executed each time any inward arc fires. Work nodes 41, 43, 45, 46, 48, 50, 52, 54 have states of initial or fired. When the inward arc is fired on a work node 41 in the initial state, the work node 41 changes its state to fired and performs or requests its associated activity. When the inward arc is fired on a work node 41 in the fired state, nothing is done.

A reset arc, for example, between nodes 42–45, together with the forward arcs between its destination and source, forms a loop. When traversed, a reset arc causes all nodes 42–45 within its loop to be reset. Resetting a fired work node 43 changes its state to initial so that the node 43 can be re-executed. Resetting an active work node 43 cancels the current execution of the corresponding process activity and changes its state to initial.

Associated with each workflow process 18, there is a process data template defined by a workflow process designer module 22a (shown in FIG. 2). The process data template is used to provide initial data for the creation of process instances. At run time, based on the process data template and read/write lists of activities defined in a workflow process 18, HP OpenPM will generate a case packet for each process instance to facilitate data passing between activities and the HP OpenPM engine 20.

HP OpenPM Process Execution

Figure 4:
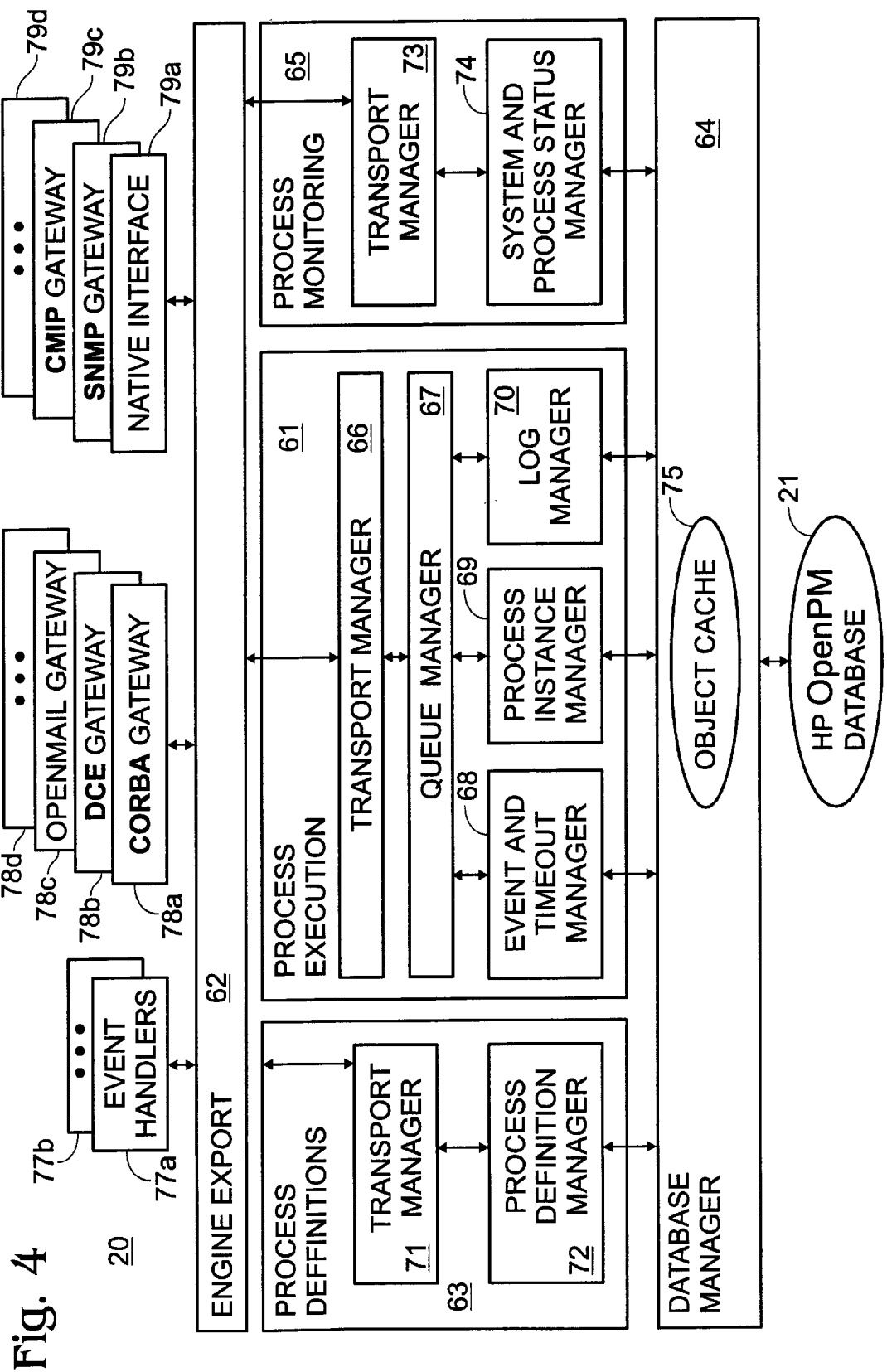
FIG. 4 is a block diagram of the preferred form of workflow process software engine that coordinates execution flow of the managed process.

FIG. 4 is a block diagram of the preferred form of a workflow process software engine, such as the HP OpenPM engine 20, that coordinates execution flow of the workflow processes 18. The HP OpenPM engine 20 functions as a highly reliable, log-based state machine which interfaces with external environments through a uniform CORBA-based transport interface, independent of the actual physical dispatch of the requests.

The HP OpenPM engine 20 launches workflow process instances in response to user requests. For each instance, the HP OpenPM engine 20 steps through the nodes in the directed graph 40 (examples shown in FIG. 3 and FIG. 7) according to the order specified in its workflow process definition. For work nodes, the HP OpenPM engine 20 executes the associated process (forward) activity. For rule nodes, the HP OpenPM engine 20 evaluates the rules and performs the rule actions when the rule conditions are met.

Each node transition is durably logged to facilitate forward rolling of incomplete workflow processes 18 at system restart time in the event of a system failure or to facilitate a support activity compensation process in the case of a business activity failure. In addition, the HP OpenPM engine 20 allows flexible specification of compensation scopes and actions, such as compensation activity or cancel activity, to support various application needs.

In the HP OpenPM engine 20, different versions of similar workflow processes 18 are supported by the engine 20 under the concept of a process group. A user can designate a particular version as the default version to be used when no specific version is requested at the time a workflow process instance is created.

To monitor the progress of running business activities and support system management, the HP OpenPM engine 20 maintains a comprehensive log of all events using a log manager 70 and provides a native interface 79a as well as an SNMP 79b and CMIP 79c gateways to facilitate integration with the HP Open View environment. The formats and contents of the logged information can be customized to support specific application needs.

HP OpenPM Workflow Objects

The HP OpenPM engine 20 has to interact with business activities supported by various implementations encountered in real life. These activities can range from manual handling by users 14a–b to automated processes executed by computers 15a–b. An infrastructure is needed to enable the effective management and invocation of these business activities.

Distributed object technologies have become the primary infrastructure for enterprise-scale distributed computing. Among them, the OMG (Object Management Group) CORBA (Common Object Request Broker Architecture) technology has been developed to support interoperability for application integration.

Based on CORBA technology, in the HP OpenPM engine 20, an abstraction called a business object 93a (shown in FIG. 5) is built to encapsulate whatever piece of work each process activity has to accomplish. The wrapping code provides an IDL (Interface Definition Language) interface. The business objects are catalogued by a database manager 64 in the HP OpenPM business object library in business databases 94a–c (shown in FIG. 5). An object cache 75 is optionally used to optimize business object access.

A business object 93a, as defined by the OMG, is a representation of something active in the business domain, including its business name and definition, attributes, behavior and constraints. It provides a uniform way to encapsulate legacy systems and applications and a direct mapping, in understandable business terms, between the business model and the possibly sophisticated operational procedures of the workflow process system.

By representing these process activities in business objects 93a–c, new workflow processes 18 can be quickly created by assembling business objects 93a–c to describe workflow processes 18. The business object library avoids repetitive coding to tailor the business activity implementation to each individual workflow process 18.

HP OpenPM Resource and Policy Management

A resource is a person, computer process or machine that can be used to accomplish a task. A resource has a name and various attributes defining its characteristics, such as job code, skill set, organization unit and availability.

A policy is a set of rules that determines how resources are related to tasks within a WFPM system 10. One common use is for task assignment. Policies can be used to specify which resource, under which role, is eligible or available to perform a task. Policies are also used to ensure proper authorization and authentication.

In HP OpenPM, the mapping between the business activity (task) specified in a workflow process 18 and the business object (resource) to be invoked is performed by the resource manager 28a (shown in FIG. 2) during run time as part of the execution of the business activity. The HP OpenPM engine 20 allows multiple resource managers 28a–c to be used to resolve a single resource assignment request; each resolves the request at a different level within an organization.

HP OpenPM Worklist and Application Data Handlers

Figure 5:
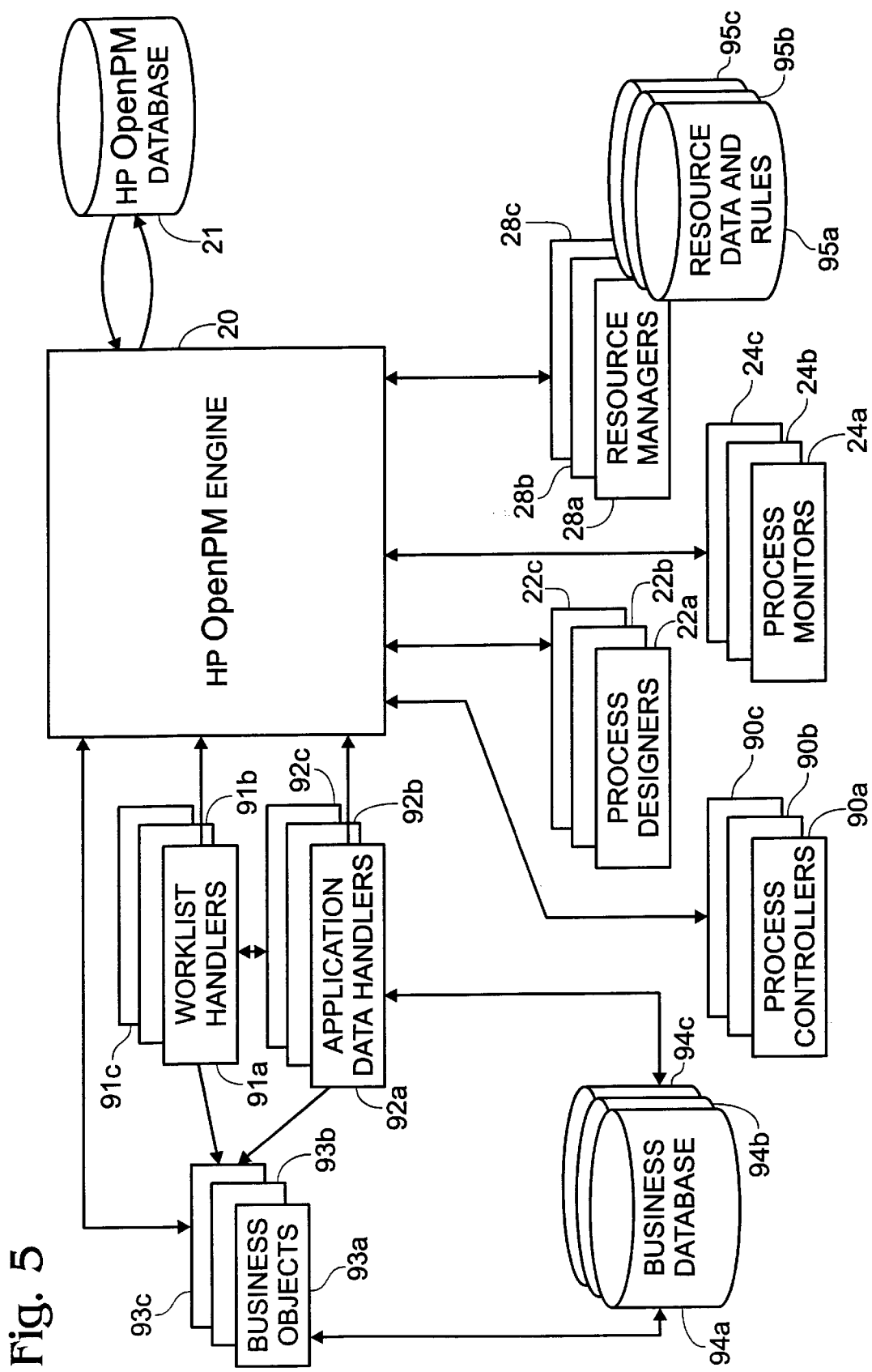
FIG. 5 is a block diagram of the system architecture with optional worklist handler and application data handler features to enhance scalability.

FIG. 5 is a block diagram of the system architecture of FIG. 2 with optional features to enhance scalability of HP OpenPM systems. Two optional components that can be added into the HP OpenPM engine 20 environment to facilitate the execution of workflow processes 18 are worklist handlers 91 a–c and application data handlers 92a–c.

The worklist handler 91a supports both engine-push and client-pull modes to provide more freedom in task assignment. In addition, the worklist handler 91a can be used to support the concept of integration on demand. Based on the task performer's profile, the worklist handler 91a determines and launches a specific environment for an activity at run time, rather than hard-wiring it into the process definitions.

The application data handler 92a supports the separation of application-specific data and process-relevant data to reduce the amount of data flow over the network. It also provides the preparation facility for application-specific data to remove the burden of database access from activity performers.

HP OpenPM Security

In today's business environments, security must be implemented enterprise-wide. The security service developed by the OMG provides authentication and encryption for the HP OpenPM engine 20 to prevent eavesdropping and forgery. The HP OpenPM engine 20 infrastructure components can identify each other and vouch for the credentials of end-user components.

WFPM in the Telecommunications Management Network

Figure 6:
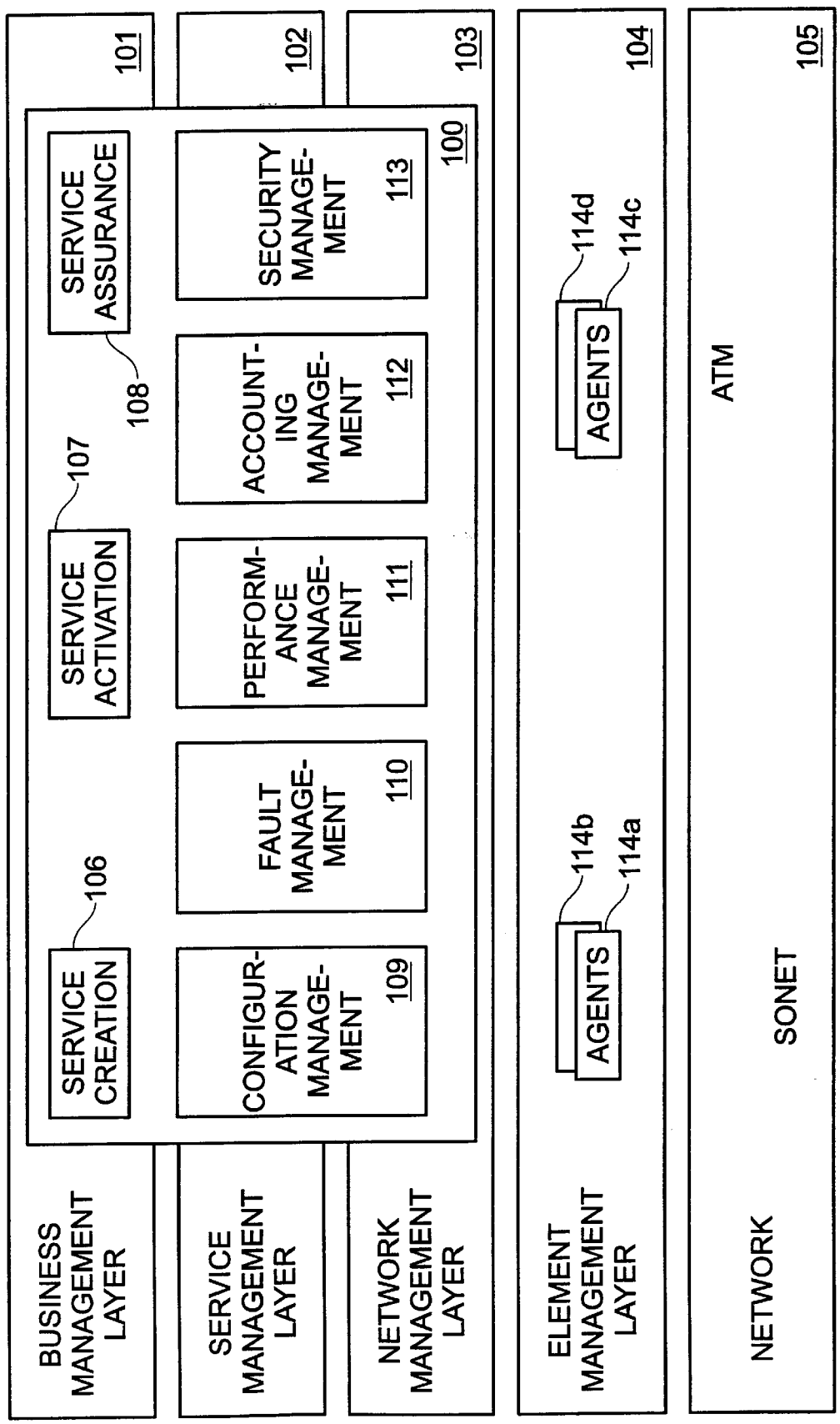
FIG. 6 is a diagram showing management function layers provided by business process flow management using the system of FIGS. 1–5 for the example of management of a telecommunications network.

FIG. 6 is a diagram showing management function layers 101, 102, 103, 104, 105 provided by workflow process management using the system of FIGS. 1–5 for an example of the management of a telecommunications network. The Telecommunications Management Network (TMN) defined by the International Telecommunications Union is changing the way operations support systems and business support systems solutions are being developed. The TMN architecture separates layers of functionality and provides access by elements in any one layer to any element in the layer immediately below, as shown in FIG. 6. Before the introduction of the TMN model, operations support systems and business support systems solutions were isolated from each other and could not interoperate.

The HP Open View Distributed Management platform supports the realization of TMN operations support systems and business support systems solutions for the TMN element management layer 104 and network management layer 103. However, a middleware service is needed for supporting the service management layer 102 and even the business management layer 101 of the TMN model. The next section presents an example of this support.

At the service management layer 102, the WFPM process enabling framework is required to be able to support re-engineering and transformation processes for strategic operations support systems and business support systems, to integrate existing operational environments to form an enterprise hub for service management and provisioning, deploy new management services as rapidly as possible, to monitor and measure processes, to tune processes to benefit from experience and to automate processes to reduce execution time.

SONET Configuration Management Prototype

Figure 7:
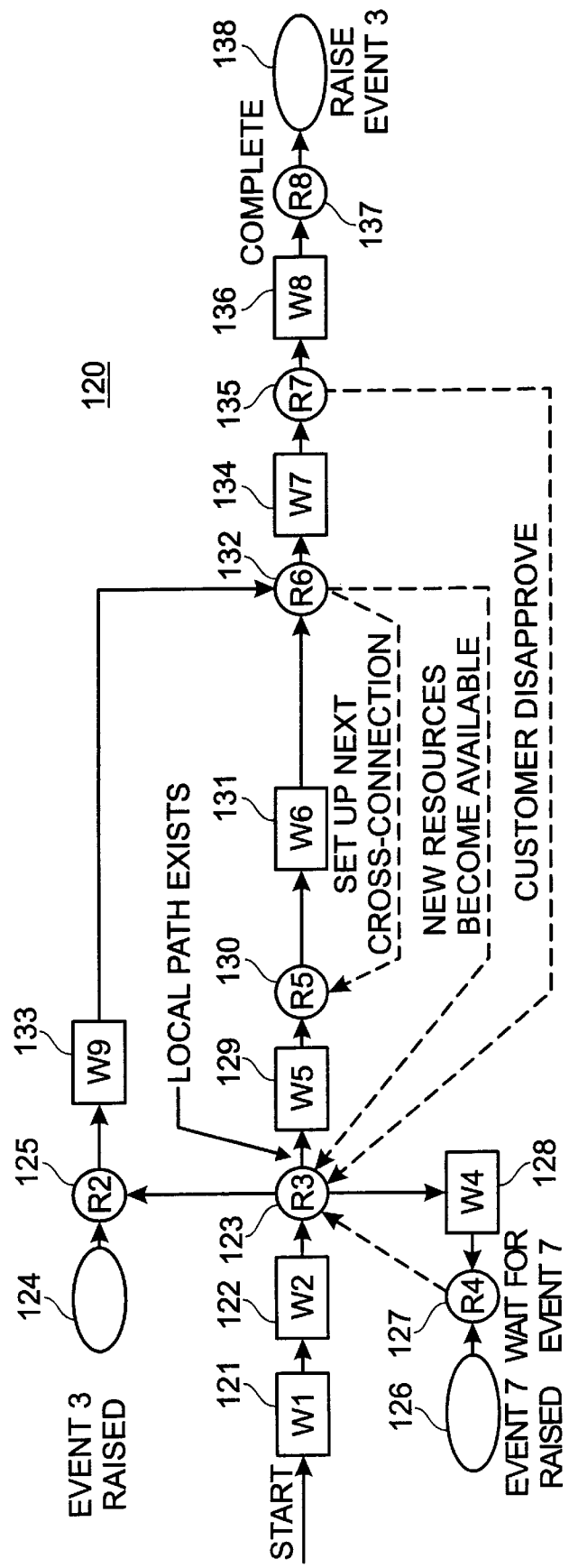
FIG. 7 is a process definition diagram for configuration management of the telecommunications network in the example of FIG. 6.

FIG. 7 is a process definition diagram for configuration management of the telecommunications network in the example of FIG. 6 based on the HP OpenPM system. It depicts a prototype to demonstrate the application of WFPM technology in the specific domain of SONET (Synchronous Optical Network) configuration management. The prototype was a joint project between HP Laboratories in Bristol, England and Palo Alto, Calif. to demonstrate the middleware technologies required to automate the processes supporting the configuration management of a SONET telecommunications network.

The scenario demonstrated by this prototype consists of the provision of a new VC4/VC12 path for customers. It goes through several different steps for this operation: search for a new route, negotiate the service level agreement (SLA) with the customer, configure the new path, and finally, update the SLA for this customer. The HP OpenPM process definition supporting the process of providing this new SONET data path is sketched in FIG. 7 which shows the HP Open View process definition for SONET configuration management.

Searching for and configuring a new path in SONET are complex processes requiring a lot of interaction with the SONET MIB (Management Information Base) and network elements. This type of operation is a source of errors when it is performed manually by an operator as a set of individual, uncorrelated activities.

In the prototype, such complex operations as searching and configuring new paths are handled as workflow processes 18 and automated by an HP OpenPM engine 20 in an environment interacting with HP Open View DM and Oracle DBMS applications.

Depending upon the changing business needs, a customer can request to add or drop communication paths between certain endpoints in a private virtual network (PVN). In HP OpenPM, these services can be modeled as workflow processes 18 to be executed by the service provider. Adding a new path may consist of the following activities and decision points:

1. Retrieve the customer's profile from the customer database for customer-PVN-specific information.
2. Locate the closest add-drop multiplexers (ADMs) to the endpoints, based on the information stored in the SONET physical configuration database.
3. Check whether fiber connections exist between the endpoints and the two end-ADMs.
4. If not, issue a request for an engineer to go on-site and physically connect the endpoints to the end-ADMs. After the establishment of the connection, the process continues on to step 5 and an independent subprocess is initiated to watch for resource changes.
5. Find valid routes between end-ADMs. This requires access to the routing table in the SLA database to determine whether any valid routes exist between the two end-ADMs. Either a list of ADMs is returned signifying the ADMs that must be configured to realize the route, or "No Route Found" is returned. For a returned list of ADMs, this activity will then use the HP Open View DM facility agent to collect port information stored in the MIB to determine the available ports between the ADMs that are fibered together and can be used to enable the path.
6. Check network element (NE) capabilities. For an ADM in the route, this activity uses the HP Open View DM NE agent to access the MIB information to determine whether a VC4 cross-connection can be set up in the ADM between the selected ports of the ADM. This activity has to be executed for each ADM in the route. During steps 5 and 6, if any additional resources become available, HP OpenPM cancels any currently running activity and starts the process over from step 5 to consider these newly available resources.
7. Get customer's approval of the selected configuration. Once a suitable path is identified, the customer will review the offer, including available date, charges, quality of services (QoS), and so on. Depending upon the business factors (e.g., cheapest service wanted), the customer may request that a new search be initiated, that is, loop back to step 5 to find another valid route.
8. Configure the selected route. This activity is responsible for setting up the cross-connections in each ADM by invoking the HP Open View DM NE agent and updating the SLA database.

Distributed Resource Management

As mentioned above, there are several reasons why resource management in a workflow management system (WFMS) is difficult:

1. The number of resources is large,
2. Resource status (e.g., availability and load) changes frequently,
3. Resources belong to different organizations.

The invention employs a distributed resource management approach that reduces the above difficulties.

Figure 8:
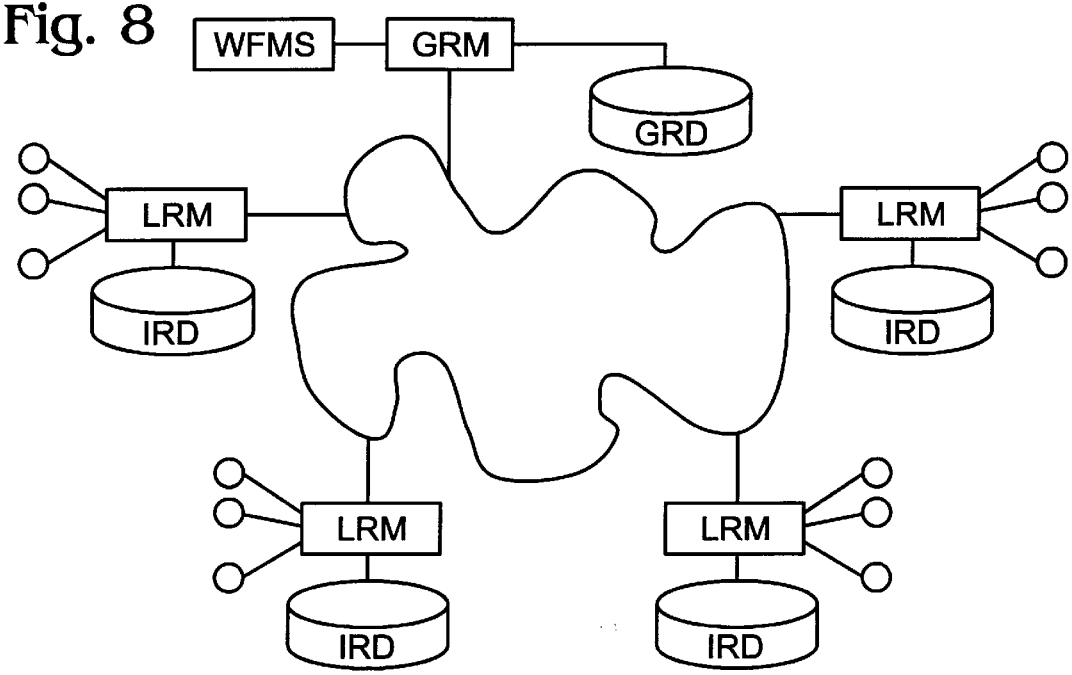
FIG. 8 is a simplified version of the block diagram of FIG. 1 showing the distributed resource management architecture of the system according to the present invention.

FIG. 8 shows the architecture of a distributed resource management system. As in the local management approach, there is one global resource manager (GRM) 142 connected to the WFMS 17 and a number of local resource managers (LRMs) 144A–144D each manage a number of resources 146A–C, 147A–C, 148A–C, 149A–C at their respective sites. The invention employs the concept of two-step resource assignment. Instead of doing resource assignment in one step either at a central site (in global management approach) or at remote sites (in local management approach), the approach of the present invention first checks at a central site (the GRM) the availability of resource groups, and then selects, at remote sites, specific resources from the group.

Before going into details of the approach, let us first introduce the concepts of resource groups and two-step resource assignment. A resource group, as its name suggests, is a group of resources that all can assume a process role. For example, Allan, Bob, Charles, and Doug are all software engineers and thus form a resource group that can assume software engineer role. As another example, a cluster of computers in the system could include a number of printers with similar printing capabilities. Resources in a resource group should be in the same site and managed by the same resource manager. A resource can be in one or more resource groups and a resource group may assume one or more process roles.

The basic idea of two-step resource assignment is to manage resources at two levels: resource groups at the GRM and individual resources at LRMs. More specifically, LRMs have information of and full control over each individual resources they manage. The LRMs each have an individual resource database 150 keep track of not only static information of resources such as roles and addresses, but also dynamic status information such as availability and work load. The GRM, on the other hand, has a group resource database 152 which only has information about resource groups. The resource assignment is done in two steps:

1. The GRM 142 first maps process role of a process activity to a resource group and checks the availability and load of the group. The LRM 144 that manages the selected group is then contacted.
2. The LRM for the selected group further maps the group into individual resources and checks their availability and work loads. The selected resources will then be informed or invoked to perform the work item.

The two-step resource management and assignment is motivated by the following two observations. The first observation is that, in most workflow environments, a process role can often be assumed by many individual resources. The number of resource group is thus much smaller than that of individual resources. The second observation is that, although the status of an individual resource may change frequently, the status of a resource group changes much less frequently. For example, it is very likely that a particular person is on vacation at a given time, but it is very unlikely that all persons in a group are on vacation at the same time.

The advantages for having the GRM manage remote resources at the group level are two-fold. First, it reduces the number of individual resources it has to manage, due to the smaller number of resource groups. Second, and more importantly, it reduces the overhead of keeping track of remote resource status. In most cases, it is sufficient for the GRM to know that at least one resource that can perform the task is available. It is much easier to keep this information up to date than to keep track of status of every individual resources that can perform the task. With proper resource group definition, it is possible that the status of individual resources in a group changed many times before that of the group has been affected. By separating responsibilities between the GRM and LRMs, it significantly reduces the number of updates that the GRM has to make in order to keep resource status in sync at the central site.

The traditional local management approach is a special case of the distributed management approach of the present invention. A given resource group can be a singleton resource. In general, the singleton resource group can also be used for important remote resources that need to be monitored individually by the GRM. The traditional method for handling singletons using the traditional local management approach, however, does not scale to multiple resources, and has not used two-step resource management and assignment as described herein.

Subsequent sections describe details of the proposed distributed resource management approach. In particular, we will discuss specification of resource group and their dependency upon individual resources. Also discussed are the propagation of status change of individual resources to resource groups. A proposed implementation of the approach will be described in the context of the HP OpenPM workflow management system but could similarly be implemented in other such systems.

Resource Specification

A resource group is a three element tuple:

$$G=<S, C, A>,$$

where S is the definition (including status specification), C is a Boolean-valued consistency predicate that specifies when G's status should be re-evaluated, and A is a collection of status update procedures that are used to bring G's status up to date.

One objective of workflow resource management is to minimize the number of remote updates that invoke status update procedures to bring resource group status at remote sites up to date. The traditional approach is eventual consistency which delays propagations of resource status change to remote sites. That approach is unfortunately unacceptable as WFMSs requires up-to-date resource information.

The present invention addresses the problem by macro resource management which manages remote resource at group level. This approach is possible only when resource assignment is done in two steps as we described. There are two issues in the proposed approach:

1. the specification of resources, resource groups and their relationships which is described in the section, and
2. the propagation of individual resource status changes to remote GRMs, which is described in the next section.

Resources and Resource Groups

A resource group G is modeled as an object with five attributes:

name, members, capabilities, status and history.

Each resource group has a name and is characterized by a set of member resources. Capabilities, status, and history are the three attributes based on which the GRM assigns resource groups to work items. The capabilities of a resource group is used to determine the role it can assume, while the status indicates its availability and the current load. Since the resource manager does not have the exact status information of managed resources, it also uses history information of previous assignments as a hint of accuracy of recorded status data.

Example history data include the number of times a resource has been assigned a work item but is not available, and average waiting time of previously assigned work items. The specification and enforcement of the history attribute are similar to those of resource status and thus are omitted from the paper.

We use name(G), members(G), capabilities(G), status(G), and history(G) to denote the five attributes of resource group G. Each member resource R∈ members(G) is also modeled as an object with six attributes: name, address, manager, capabilities, status, and history.

Each member resource has a name and an address where it can be accessed. We assume that each resource is managed by exactly one resource manager. Similarly, we use name (R), address(R), manager(R), capabilities(R), status(R), and history(R) to denote attributes of R.

Resource capabilities

A resource is characterized by a set of capabilities. For example, a printer might have the following capabilities: postscript, color, and duplex. The capabilities of a resource group is a function of the common capabilities of its member resources:

$$\text{capabilities}(G) = \cap_{R \in \text{members}(G)} \text{capabilities}(R).$$

We also model a process role as an object with two attributes: name and capabilities. The attribute capabilities of a process role defines the capabilities required for a resource to assume the role. For example, a picture printing role may require a printer with color and postscript capabilities.

Figure 9:
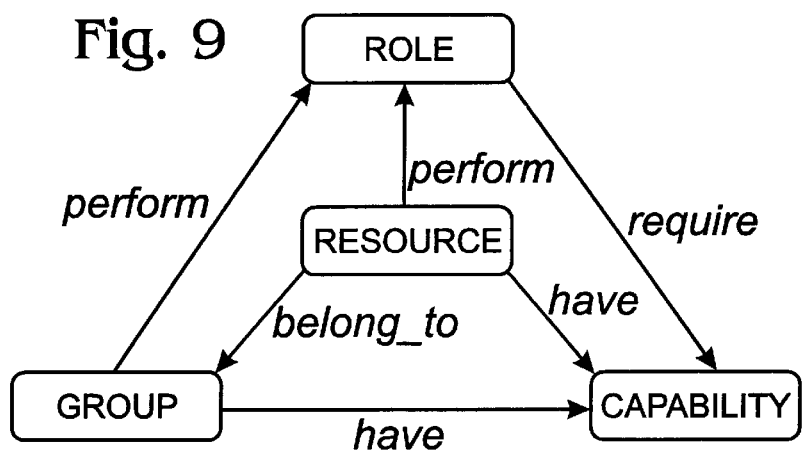
FIG. 9 is a diagram of the relationship among resources, resource groups and process roles in the distributed resource management architecture of FIG. 8.

We say that a resource R∈ member(G) can assume a process role P if capabilities(P) ⊆ capabilities(R). Similarly, a resource group G can assume a process role P if capabilities(P) ⊆ capabilities(G). By definition, a resource R can assume a role P if R ∈ members(G) and the resource group (G) can assume P. FIG. 9 shows the relationship among resources, resource groups and process roles.

Resource status

There are two aspects of resource status: state and load. The former indicates whether the resource is available for work items, while the latter gives a hint of possible waiting time. We use state(R) and load(R) to denote the current state and load of R.

Each resource can be in one of the following two states: AVAILABLE and NOTAVAILABLE. For example, a printer is AVAILABLE if it is up and running and also connected to the network. A person is NOTAVAILABLE if he (or she) is on vacation.

The state of a resource group is defined to be the number of member resources that are in AVAILABLE state. Therefore, the state of a resource group of 10 member resources can be an integer between 0 and 10.

$$\text{state}(G) = |\Re|,$$

where $$\Re = \{R \in \text{members}(G) | \text{state}(R) = \text{AVAILABLE}\}.$$

The current load of a resource is the amount of time the resource needs to finish all work items it has already been assigned to. In real workflow environments, the actual resource load is usually difficult to obtain. It is often estimated by, for example, the number of unfinished work items that have assigned to a resource.

The current load of a resource group is defined to be the average of of its member resource loads:

$$\text{load}(G) = (\cup_{R \in \text{members}(G)} \text{load}(R))/|G|.$$

Consistency Specification

This subsection describes specification of consistency predicate C for a resource group G. As we have seen, the status of a resource group is a function of member resource status. It may need to be updated when the status of member resources have changed. Consistency predicates specify when such an update is needed.

We distinguish between two kinds of resource status changes: predictable changes and unpredictable changes. Predictable status changes of a resource are known to the GRM without notification from LRMs, while unpredictable changes are ad hoc changes that the GRM will not know unless informed by the LRMs that manage the resources.

Predictable status changes

Predictable resource status changes are those that always happen at a specified time (often periodically). Predictable status changes usually happen to a group of resources. For example, engineers will not be available on weekends.

Consistency predicate for predictable status changes consists of three parts: resource specification, state specification and temporal specification. The resource specification is a list of resources (in the resource group $G$) that are affected by the change. The state specification is simply the new state (AVAILABLE or NOTAVAILABLE) of the resources after the change.

The temporal specification includes the begin time, the end time, and a specification of repeatedness. The begin/end time specification consists of six fields: year, month, day, hour, minute, and second. The third part of the specification consists of three lists: days of the week list, days of the month list, and days of the year list. They indicate whether and how the change will occur periodically (every week, every month, and every year, respectively) after the begin time. Empty lists mean that the change will only occur once.

For example, the following temporal specification says that the change will occur on every Monday and Friday of each week, and every 1st and 15th days of each month in 1996.

Begin: year(1996)month(1)day(1) hour(0)minute(0)second(0)

End: year(1997)month(1)day(1) hour(0)minute(0)second(0)

Repeat: weekly{Monday, Friday}, monthly{1, 15}, yearly{ }

Unpredictable status changes

Unpredictable status changes can happen anytime and are usually due to unpredictable situations such as a person is sick or has already been assigned with work items (possibly by other WFMSs). For example, a printer may become NOTAVAILABLE if it has broken down.

Consistency predicate for unpredictable status changes consists of an attribute name, a dependency specification and a synchronization specification. The attribute name is either state or load. Dependency between group and member resource status is as defined in the Subsection above entitled Resources and Resource Groups.

The third part is a list of possible values for resource group attribute. It also defines interesting thresholds for member resource attribute. The attribute value of the resource group will be updated whenever these thresholds have been crossed due to changes of member resource attributes.

For example, the resource group state is defined to be the number of member resources that are available. Suppose that the resource group consists of 10 member resources, the synchronization specification of {2, 5} means that the GRM is only interested in three cases: at least 5 member resources are available, at least 2 member resources are available, and at most 1 member resource is available. Thus, the resource group state will be updated when, for example, the number of available member resources changed from 2 to 1, or from 5 to 4. Resource group state will not be updated when the number of available member resources changed from 4 to 3.

Resource Management

This section describes the last component of a resource group specification, the status update procedures. We consider two general approaches: using database transactions, and using workflow processes.

Resource Management Using Database Triggers

It is very likely that resource managers (both local and global) use databases to store resource information. It is, therefore, natural to make use of database facilities to propagate changes of individual resource status to resource groups. The following Oracle trigger (See *Oracle7 server: SQL language reference manual,* Oracle Co. 1992) example updates states of resource groups when member resource states have changed.

```
create trigger state_update
after update of state on resource
referencing old as old_res for each row
when (resource.state != old_res.state)
declare
    x number;
    y number;
begin
    select state into x from group
        where ID = GROUP;
    select last_state into y from group
        where ID = GROUP;
    if (resource.state = AVAILABLE)
    then
        /* update state for GROUP */
        update group set state = state + 1
            where ID = GROUP;
        /* forward if THRESHOLD crossed */
        if (x+1==THRESHOLD) & (x-y>MAX_ERR)
        then
            update group
                set last_state = THRESHOLD
                where ID = GROUP;
            update group@grm1
                set group.state = THRESHOLD
                where group.ID = GROUP;
            update group@grm2
                set group.state = THRESHOLD
                where group.ID = GROUP;
            . . . /* for other sites */
        endif
        . . . /* for other thresholds */
        . . . /* for other groups */
    else /* NOT_AVAILABLE */
        update group set state = state - 1
            where ID = GROUP;
        if (x==THRESHOLD) & (y-x>=MAX_ERR)
        then
            update group
                set last_state = THRESHOLD
                where ID = GROUP;
            update group@grm1
                set group.state = THRESHOLD
                where group.ID = GROUP;
            update group@grm2
                set group.state = THRESHOLD
                where group.ID = GROUP;
            . . .
        endif
        . . .
    endif;
end;
```

We assume that each resource may participate in multiple resource groups and each resource group may be used by multiple GRMs. Two Oracle tables are involved: resource for individual resources and group for resource groups. Whenever a resource changed its state, the trigger will update states of resource groups of whom the resource is a member. The trigger also propagates the group state change to all GRMs that use the group when the thresholds have been crossed.

Figure 10:
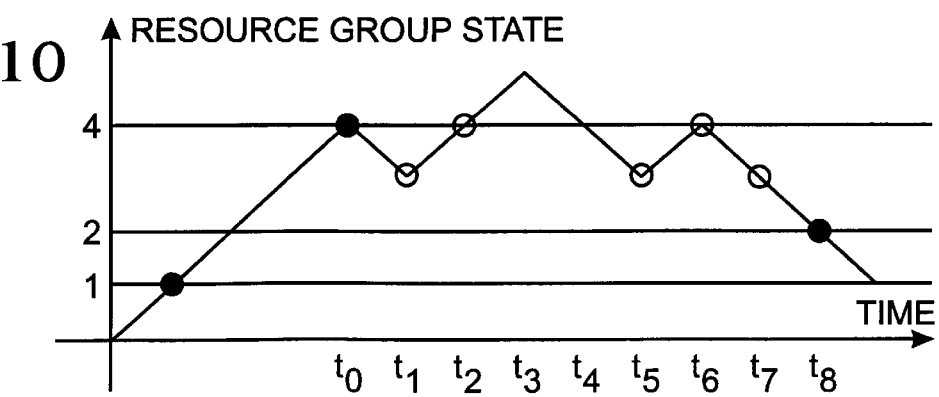
FIG. 10 is a resource state update example showing when group resource status updates are made in the system of FIG. 8.

An important assumption we have made about the proposed approach is that resource group state is relatively stable. The assumption is generally reasonable in many workflow environments. The assumption may not hold if thresholds are chosen improperly. To illustrate this, consider a resource group of 10 member resources. Suppose that 2 and 4 are two thresholds. Now consider the situation shown in the resource state update example of FIG. 10.

If we propagate changes every time a threshold is crossed, six events will be generated (resulting six remote updates), at $t_0$, $t_1$, $t_2$, $t_5$, $t_6$ and $t_7$. For example, the remote update at $t_0$ is needed because the threshold 4 has been crossed (at least 4 are available). Similarly, remote update at $t_1$ is needed as the same threshold has been crossed (less then 4 are available).

The situation is clearly undesirable and can be avoided in following ways. The first approach is to choose thresholds properly to avoid the values of common resource group state (e.g., 4 in the example). The second approach is to allow certain errors of resource group state at remote sites. Suppose, for this particular example, that we allow the group state to be off by 1, most remote updates could be avoided. In fact, only two remote updates (at $t_0$ and t8 ) are needed.

In the above Oracle trigger implementation, we keep the last propagated state and use it to calculate the state change since the last time the group state was forwarded to remote GRMs. Remote updates are necessary only if (1) a threshold is crossed, and (2) the difference between the current and the last propagated changes are big enough (>MAX.ERR).

Resource Management Using Workflow Events

In the previous example, two pieces of information have been embedded into the trigger implementation: group definitions (GROUP, THRESHOLD and MAX.ERR) and GRM references (grm1 and grm2). Group definition is used to determine if the state change should be propagated to remote GRMs, and the GRM references tell the trigger where to forward the change.

The fact that the trigger has to know in advance all of the GRMs that are interested in a resource group is undesirable. This implies that every time a GRM adds or drops a resource group, the corresponding trigger has to be modified to reflect the change. The problem can be alleviated by storing group definitions and GRM references into the underlying database, but the trigger still needs to maintain connections to all GRMs in order to do remote updates.

Another (more flexible and systematic) way to address the problem is to use workflow events. Instead of updating group states at remote sites directly, the trigger generates a workflow event which will be listened to by all WFMSs. There is a resource management process at each WFMS which updates resource groups managed by the associated GRM (see next Section for an example resource management process).

Comparing to database triggers, workflow events have the following advantages. First, workflow events allow more flexible resource management. There is an event associated with each resource group. To add a resource group to a GRM, the WFMS only needs to register the interest in the associated event. Events will be automatically forwarded to interested WFMSs by the workflow infrastructure. There is no change needed at local site (e.g., to the Oracle trigger implementation). Also, the triggers (or other database applications) do not need to maintain multiple connections to remote GRMs. It always sends events to the local WFMS.

Second, complicated resource management policies can be easily implemented using resource management processes. Most workflow systems (e.g., HP OpenPM, see next section) provide powerful decision making facilities (e.g., build-in rule engines). It is thus possible for different resource managers to have different policies on different resources. For example, it is very easy to program resource management processes to delay propagation of some (less important) resource changes, or propagate changes of some resources only when certain conditions (e.g., temporal) are met.

Third, workflow events also allow WFMSs to do things such as resource controlled process execution which are impossible if using database triggers only. Resource controlled process execution starts a process or an activity only when certain critical resources are available. This is possible by implementing a workflow process that monitors resource status. The resource monitoring process will listen to events for the critical resources and fire processes/activities as soon as the resources become available.

A System for Distributed Resource Management

This section describes an implementation of the distributed resource management using workflow events in the context of HP OpenPM workflow management system.

OpenPM Overview

OpenPM is an open, enterprise-capable, object-oriented business process management research prototype developed by Hewlett-Packard Labs. It is a middleware service that represents a substantial evolution from traditional workflow technologies. The OpenPM engine provides all the process enactment capabilities of workflow, but also allows evolution and modification of currently running processes to better meet changing business needs while remaining independent of changing business technology.

An OpenPM process is a directed graph comprising a set of nodes connected by arcs. There are two kinds of nodes: work nodes 41 and rule nodes 42. A work node defines work to be performed by external resources, while a rule node is used to define a process flow that is more complex than a simple sequence, such as concurrent process execution and synchronization of tasks. Process flows can also be controlled via events, which are raised and subscribed by rule nodes.

In OpenPM, a rule node contains a list of condition-action rules, where the condition is a Boolean expression of values such as the execution status of previous nodes, the time at which each inward arc was fired, and other data used in the process instance, while the action fires outgoing arcs. An OpenPM rule node is executed either when its inward arcs have been traversed, or the events it registered have occurred.

Figure 11:
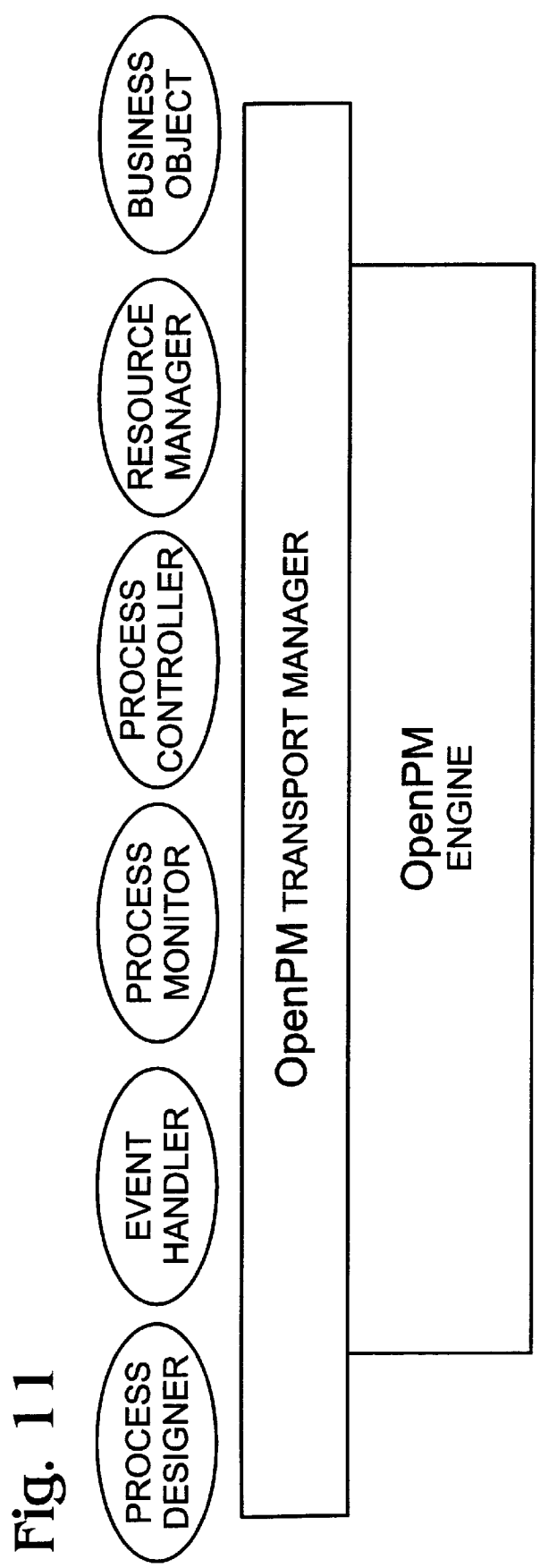
FIG. 11 is a simplified block diagram of the architecture of FIG. 2.

Referring to FIG. 11, an OpenPM system comprises an OpenPM engine 20 and a set of business objects 75, resource managers 28, process designers 22, process controllers 23, status or process monitors 24, and event handlers 77. An OpenPM process is defined using a process designer 22. Business objects are external resources that perform process activities. A process, after being defined, can be started, stopped, or intervened using a process controller 23. A status monitor 24 keeps status information about each individual process and loads information about the entire system.

The OpenPM engine coordinates overall business process execution. It functions as a collection of highly reliable and log-based state machines. An important task of OpenPM engine is to create execution instances of a process and step through nodes as defined by the process graph (see FIGS. 3 and 7). The OpenPM engine first asks resource managers to map role specification of each work nodes to business objects which are then invoked to perform tasks specified in work nodes. An OpenPM engine is also associated with a number of event handlers 77 which map external events (e.g., Oracle events) to OpenPM internal events and forward them to workflow processes that have registered for the events.

Resource Management in Federated OpenPM

Figure 12:
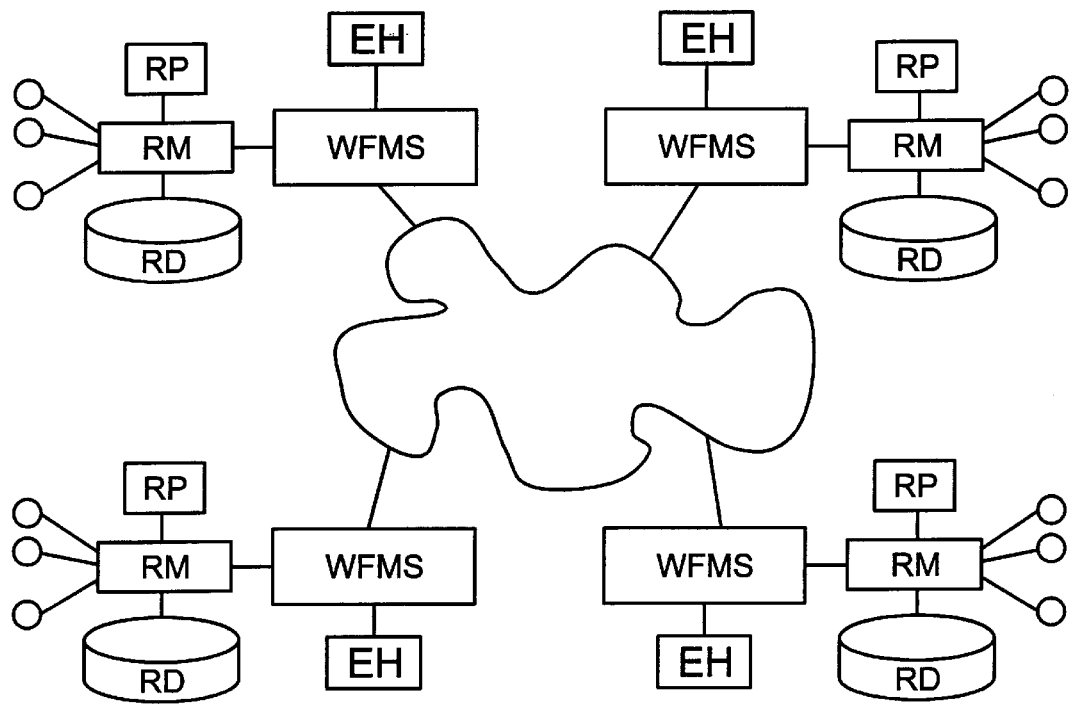
FIG. 12 a diagram similar to FIG. 8 showing an architecture of a federated process management system from the standpoint of resource management and assignment.

FIG. 12 shows the architecture of a federated OpenPM system (from the point of view of resource management and assignment), in which the following entities are shown: WFMS: workflow process management system software, in this example the HP OpenPM engine 20; RM: resource manager 28; RD: resource data 95; EH: event handler 77; and RP: resource proxy 160.

Each OpenPM engine in a federated OpenPM system is associated with a number of resource managers 28 and a number of event handlers 77. A resource manager acts like a GRM for local resources and like an LRM for remote resources. More specifically, resource managers manage (i.e., keep track of status change) business objects at local sites and also have information about business object groups at remote sites managed by other resource managers.

Updating Resource Status

Resource managers 28 maintain status information about only those remote business object groups that are needed for process execution by the OpenPM engine. Resource managers register to remote resource managers their interests in business object groups. They also keep, for each business object group they manage, a list of remote resource managers that have registered interested in the group.

Figure 13:
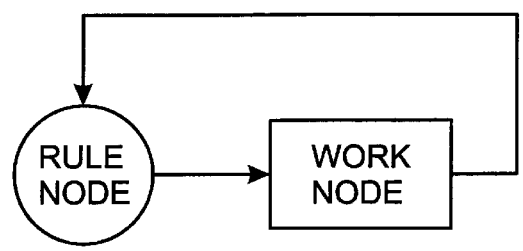
FIG. 13 is a graphic representation of a process for monitoring local and remote business object groups associated with a given resource manager in the system of FIG. 12.

There is a special resource management process running at each OpenPM engine whose purpose is to monitor local and remote business object groups known to the associated resource manages. FIG. 13 is a graph representation of the process. The basic process consists of a work node 41 and a rule node 42. (The actual process can be more complicated than this in order not to miss forthcoming events when processing current events.) The rule node listens for events corresponding to each business objects groups. The rule node fires the work node when such an event occurs. The work node either forwards the event to remote resource manages if it corresponds to a local business object group, or updates status data in the associated resource manager if it corresponds to a remote business object group.

The following are the general steps required in updating status of a business object groups:

1. A member business object status has changed. Assume, as a consequence, the group status threshold has been crossed.
2. The database trigger is invoked and generates a database event.

3. The database event is captured by the corresponding event handler which maps it into an OpenPM event and forward it to the resource management process.

4. The resource management process invokes the business object that forwards the event to all interested remote OpenPM systems. It access local resource database for a list of remote resource managers that are interested in the business object group.

5. Event handlers at remote sites get the event and forward it to the corresponding resource management processes.

6. The remote resource management processes invoke corresponding business objects that update the group status data in the associated resource databases.

Resource Assignment

A key component for resource assignment in OpenPM is a resource proxy 160 which is a middleware between OpenPM engine and business objects. A resource proxy is responsible for the second step of the proposed distributed resource management. The complete resource assignment procedure is as follows:

Step 1. OpenPM engine sends a request to a local resource manager which maps a process role (for a process activity) to either a business object or a business object group. The resource manager sends back to the OpenPM engine the address of the selected business object or the address of resource proxy for the selected business object group. If it is an individual business object, OpenPM engine invokes it directly to perform the task. Otherwise, the OpenPM engine sends a message to the resource proxy with business object group specification.

Step 2. The resource proxy first contacts the resource manager (that manages the business object group) to map the business object group to an individual business object. It then invokes the selected business object. After completion, the business object replies directly to the OpenPM engine.

In summary, the problems related to distributed resource management and assignment in workflow systems are largely solved by using a two-sass resource assignment approach. This approach significantly reduces the overhead required to manage remote resources (i.e., to keep track of resource status). The general interdependent data management techniques does not address workflow resource management problem satisfactorily, as the number of resources to be managed are large and the status change of a remote resource has to be propagated immediately to the workflow system. The invention addresses the problem by managing remote resources at group level. Resource groups allow the workflow system to do resource assignment without status information of individual resources, thus significantly reducing resource management overhead.

Efficient resource management and assignment is important to workflow process execution. We also realize that correct and optimal resource assignment is not always possible, due to dynamic behavior of workflow resources. The proposed approach works best for workflow environments where most workflow tasks can be performed by multiple resources and resource group status are stable (comparing to that of individual resources). Further studies are needed for other workflow environments where the above assumptions may not be true.

The resource management problem is addressed here in a limited scop, but the applicability of the invention is not so limited. For example, we only discussed two-step resource assignment approach. It can easily be extended to n-step resource assignment. Also, we only discussed availability and load of resource status. There are other aspects of resources that may also be useful in resource assignment.

Another point worth mentioning is the equilibrium assumption of resources in a group. In practice, resources in a group are not the same, as some may be more important or capable than others. For example, some printers can print faster than others. In some circumstances it might be necessary to take this into account when specifying resource groups, consistency predicates and thresholds.

Having described and illustrated the principles of the invention in a preferred embodiment thereof, it should be apparent that the invention can be modified in arrangement and detail without departing from such principles.

We claim all modifications and variations coming within the spirit and scope of the following claims:

1. A method for distributed resource management in a computer network including multiple computers operating under control of a workflow management software system (WFMS) to manage a plurality of resources to carry out a workflow process that includes multiple process activities, the computers comprising a processor, memory and input/output facilities, the method comprising:

grouping the resources according to a shared set of capabilities into resource groups including at least one resource;

storing in a first of said computers a global resource manager (GRM) and data defining a resource capability of one or more of said groups and a resource status for each group;

storing in a second of said computers a local resource manager (LRM) for at least one of the groups and data defining a capability and status of each resource in each group coupled to the second computer;

operating the WFMS to invoke the global resource manager with a request for a specified activity by one of the resources in the system; and the GRM responding to the request by checking the stored capabilities and status the resource groups, selecting one of the resource groups having the capability to perform the specified activity and a status that enables the group to do so, and forwarding the request to the LRM of the second computer for the selected resource group.

2. A method of distributed resource management according to claim 1 in which the LRM in the second computer responds to the request by selecting one of the resources in the selected one of the resource groups to perform the specified activity and assigning the activity to the selected resource.

3. A method of distributed resource management according to claim 1 in which the LRM in the second computer updates the stored status data of the resources of each group coupled to the second computer.

4. A method of distributed resource management according to claim 3 in which the LRM in the second computer forwards a status update to the GRM of the first computer when a predetermined threshold condition is crossed for one of the groups, and the GRM updates the stored status data for that group in the first computer.

5. A method of distributed resource management according to claim 1 in which the stored status data of the resources of each group coupled to the second computer includes availability of each resource in the group.

6. A method of distributed resource management according to claim 1 in which the stored status data of the resources of each group coupled to the second computer includes work load of each resource in the group.

7. A method of distributed resource management according to claim 1 in which the resource status data of each group stored in the first computer includes availability of the resources of that group.

8. A method of distributed resource management according to claim 1 in which the GRM stored data for a resource group G has a name, is characterized by a set of member resources and has three attributes including capabilities common to the group, status of the group, and history including activities previously assigned to the group, based on which the GRM assigns resource groups to process activities.

9. A method of distributed resource management according to claim 1 in which the LRM stored data for resource R which is a member of resource group G includes six attributes: name, address and manager of each resource, and the capabilities, status, and history of each resource, based on which the LRM assigns a resource to a process activity assigned by the GRM to resource group G.

10. A method of distributed resource management according to claim 1 in which each computer in the computer network includes said workflow management software system (WFMS) and an associated GRM, the method further comprising:

associating a workflow event with each resource group;

a first WFMS adding a resource group to its GRM by registering an interest in the workflow event which is propagated to other WFMSs in the network; and a second WFMS generating a workflow event for a particular resource group which is broadcast over the network to the first WFMS.

11. A process flow management system with distributed resource management, comprising:

computer network including a plurality of computers having a processor, memory and input/output facilities;

a workflow process management software system (WFMS) operating on one or more of the computers to control of the network for managing a workflow process comprising a logical sequence of multiple process activities; a plurality of resources coupled to respective ones of the computers to carry out various process activities, the resources being assigned to distinct groups, each including at least one resource, according to a common set of capabilities;

in a first of said computers, a global resource manager (GRM) and stored data defining a resource capability of one or more of said groups and a resource status for each group;

in a second of said computers a local resource manager (LRM) for the resources of at least one of the groups and stored data including at least a capability and status of each resource in each group coupled to the second computer;

the WFMS including means for invoking the global resource manager with a request for a specified process activity by one of the resources in the system; and the GRM including:

means responsive to the request for checking the stored capabilities and status of the resource groups, means for selecting one of the resource groups having the capability to perform the specified activity and a status that enables the group to do so, and means for forwarding the request to the LRM of the second computer for the selected resource group.

12. A process flow management system according to claim 11 in which the LRM in the second computer includes means responsive to the request forwarded to the LRM for selecting one of the resources in the selected one of the resource groups to perform the specified activity.

13. A process flow management system according to claim 11 in which the LRM in the second computer includes means for updating the stored status data of the resources of each group coupled to the second computer.

14. A process flow management system according to claim 13 in which the LRM in the second computer includes means for determining when a predetermined threshold condition is crossed for one of the groups, and means for forwarding a status update to the GRM of the first computer for use by the GRM to update the stored status data for that group in the first computer.

15. A process flow management system according to claim 11 in which the stored status data of the resources of each group coupled to the second computer includes current availability of each resource in the group.

16. A process flow management system according to claim 11 in which the stored status data of the resources of each group coupled to the second computer includes work load of each resource in the group.

17. A process flow management system according to claim 11 in which the status data of the resources of each group stored in the first computer includes current availability of the resources of that group.

18. A process flow management system according to claim 11 in which the GRM stored data for a resource group G has a name, is characterized by a set of member resources and has three attributes including capabilities common to the group, status of the group, and history including activities previously assigned to the group, based on which the GRM assigns resource groups to process activities.

19. A process flow management system according to claim 11 in which the LRM stored data for resource R which is a member of resource group G includes six attributes: name, address and manager of each resource, and the capabilities, status, and history of each resource, based on which the LRM assigns a resource to a process activity assigned by the GRM to resource group G.

20. A process flow management system according to claim 11 in which each computer in the computer network includes said workflow management software system (WFMS) and a resource manager (RM) which manages status changes at local resources and has information about groups of remote resources that are managed by other resource managers and that are needed for process execution by the WFMS.

* * * * *